United States Patent
Yamagami et al.

(10) Patent No.: US 9,577,510 B2
(45) Date of Patent: Feb. 21, 2017

(54) INVERTER DEVICE

(71) Applicant: KABUSHIKI KAISHA TOYOTA JIDOSHOKKI, Kariya-shi, Aichi-ken (JP)

(72) Inventors: Tomohiro Yamagami, Kariya (JP); Toshiaki Nagase, Kariya (JP); Naohito Kanie, Kariya (JP); Tomohiro Ohba, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 14/443,861

(22) PCT Filed: Nov. 1, 2013

(86) PCT No.: PCT/JP2013/079681
§ 371 (c)(1),
(2) Date: May 19, 2015

(87) PCT Pub. No.: WO2014/080740
PCT Pub. Date: May 30, 2014

(65) Prior Publication Data
US 2015/0295490 A1    Oct. 15, 2015

(30) Foreign Application Priority Data

Nov. 26, 2012  (JP) .................................. 2012-257686

(51) Int. Cl.
*H02M 1/32* (2007.01)
*H02M 1/36* (2007.01)
(Continued)

(52) U.S. Cl.
CPC ........ *H02M 1/36* (2013.01); *B60L 3/00* (2013.01); *B60L 15/007* (2013.01); *H02M 1/32* (2013.01);
(Continued)

(58) Field of Classification Search
CPC ........ H02M 1/32; H02M 1/36; H02M 7/5387; H02M 7/53871; H02M 7/537; H02M 7/5375
See application file for complete search history.

(56) References Cited

U.S. PATENT DOCUMENTS 7,568,337 B2 *  8/2009 Uchida ................. F01N 3/0842
422/83
7,859,207 B2   12/2010 Yamada et al.
(Continued)

FOREIGN PATENT DOCUMENTS

JP    2002-165357 A    6/2002
JP    2007049837 A    2/2007
(Continued)

OTHER PUBLICATIONS

International Preliminary Report on Patentability dated May 26, 2015 from the International Searching Authority in counterpart application No. PCT/JP2013/079681.
(Continued)

*Primary Examiner* — Adolf Berhane
*Assistant Examiner* — Sisay G Tiku
(74) *Attorney, Agent, or Firm* — Sughrue Mion, PLLC

(57) ABSTRACT

An inverter device includes an inverter circuit, which has switching elements in a bridge connection, a capacitor, which is connected in parallel to the input side of the inverter circuit, a control device, which controls the inverter circuit, a temperature detector, which detects the temperature of the capacitor, a degree-of-deterioration determiner, which deter-
(Continued)

mines the degree of deterioration of the capacitor, and a warm-up controller. When the temperature of the capacitor detected by the temperature detector is lower than a prescribed temperature, the warm-up controller controls the switching elements of the inverter circuit to supply a direct current set based on the degree of deterioration and the temperature of the capacitor to the coil of an electric motor connected to the output side of the inverter circuit.

5 Claims, 4 Drawing Sheets

(51) Int. Cl.
| | | |
|---|---|---|
| H02M 7/5387 | (2007.01) | |
| H02M 7/537 | (2006.01) | |
| H02M 7/5375 | (2006.01) | |
| H02M 3/07 | (2006.01) | |
| B60L 15/00 | (2006.01) | |
| B60L 3/00 | (2006.01) | |
| H02M 7/44 | (2006.01) | |
| H02P 27/06 | (2006.01) | |

(52) U.S. Cl.
CPC ............. *H02M 7/44* (2013.01); *H02M 7/5375* (2013.01); *B60L 2210/30* (2013.01); *B60L 2210/42* (2013.01); *B60L 2240/525* (2013.01); *B60L 2240/526* (2013.01); *B60L 2240/529* (2013.01); *H02M 7/5387* (2013.01); *H02M 2001/327* (2013.01); *H02P 27/06* (2013.01); *Y02T 10/644* (2013.01); *Y02T 10/645* (2013.01); *Y02T 10/7241* (2013.01)

(56) References Cited

U.S. PATENT DOCUMENTS

| | | | |
|---|---|---|---|
| 2002/0085397 A1 | 7/2002 | Suzui et al. | |
| 2009/0039813 A1* | 2/2009 | Yamada | H02P 21/34 318/434 |
| 2009/0315518 A1* | 12/2009 | Soma | B60K 6/445 320/134 |
| 2011/0222319 A1 | 9/2011 | Marumo et al. | |
| 2011/0273141 A1* | 11/2011 | Kanbayashi | B60K 6/48 320/134 |
| 2012/0025613 A1* | 2/2012 | Morita | B60L 3/00 307/64 |
| 2015/0008734 A1* | 1/2015 | Ishida | B60R 16/033 307/10.1 |
| 2015/0012175 A1* | 1/2015 | Hara | B60R 16/03 701/36 |

FOREIGN PATENT DOCUMENTS

| | | |
|---|---|---|
| JP | 2009-60776 A | 3/2009 |
| JP | 2011188649 A | 9/2011 |
| WO | 2009136483 A1 | 11/2009 |

OTHER PUBLICATIONS

International Search Report for PCT/JP2013/079681 dated Dec. 10, 2013.

* cited by examiner

US 9,577,510 B2

INVERTER DEVICE

FIELD OF THE INVENTION

The present invention relates to an inverter device.

BACKGROUND OF THE INVENTION

Inverter devices that drive an electric motor include a capacitor as a component. The internal resistance of the capacitor increases under a low-temperature environment. If a great input is applied to such an inverter device from the electric motor during, for example, regenerating operation, an internal voltage is increased and internal elements of the inverter device may be destroyed. To avoid such a situation, the temperature of the capacitor needs to be quickly increased to reduce the capacitor internal resistance. For this reason, warm-up control is performed in which, during a startup, an electric current is applied for a few seconds without the electric motor being rotated, and thus generated heat is used to increase the temperature of the capacitor.

For example, Patent Document 1 discloses a method for controlling an electric motor that increases the temperature of a capacitor of an inverter device at a low ambient temperature. Specifically, depending on the ambient temperature of the inverter device, a ripple voltage is generated by the equivalent series resistance of the capacitor. The maximum allowable motor current value at which the components of the inverter device are not damaged by the ripple voltage is set using a map or a relational expression representing a relationship between the maximum value of the motor current and the temperature. If the maximum allowable motor current value set based on the temperature of the capacitor is lower than a value capable of generating torque required for starting the electric motor, the angular position of the rotor of the electric motor is estimated and a direct current lower than or equal to the maximum allowable motor current value is supplied as a d-axis current to increase the temperature of the capacitor of the inverter device. After the maximum allowable motor current value set based on the temperature of the capacitor reaches and exceeds a value capable of generating the torque required for starting the electric motor, the inverter device is controlled to supply alternating currents to the electric motor.

PRIOR ART DOCUMENT

Patent Document

Patent Document 1: Japanese Laid-Open Patent Publication No. 2009-60776

SUMMARY OF THE INVENTION

To promptly increase the capacitor temperature, a great current may be supplied during the warm-up control. However, if a great current is supplied to the inverter device under a low-temperature environment as the warm-up control, the voltage drop amount is undesirably increased since the internal resistance of the capacitor is increased. If the voltage drop amount is great, the system becomes unstable, and the microcomputer of the inverter device may be reset. The internal resistance of the capacitor increases even at ordinary temperatures due to progress of deterioration by long-term use. Furthermore, in a case in which the capacitor is used under a low-temperature environment, in addition to the internal resistance at the ordinary temperatures, the internal resistance of the capacitor is increased by an amount corresponding to the decrease in the temperature. Conventionally, the warm-up control is performed at a current value that depends on the assumption that the degree of deterioration of the capacitor is the maximum as shown by characteristic line L10 in FIG. 5. When such a control is performed, the current value of the warm-up control is limited even if deterioration of the capacitor has not progressed, and the warm-up control of the capacitor takes a long time.

Accordingly, it is an objective of the present invention to provide an inverter device that promptly completes warm-up of a capacitor at a low ambient temperature.

To achieve the foregoing objective and in accordance with one aspect of the present invention, an inverter device is provided that includes an inverter circuit having a plurality of switching elements in a bridge connection, a capacitor, which is connected in parallel to an input side of the inverter circuit, a temperature detector, which detects a temperature of the capacitor, a degree-of-deterioration determiner, which determines a degree of deterioration of the capacitor, and a warm-up controller. When the temperature of the capacitor detected by the temperature detector is lower than a prescribed temperature, the warm-up controller controls the switching elements of the inverter circuit to supply a direct current set based on the degree of deterioration and the temperature of the capacitor to a coil of an electric motor connected to an output side of the inverter circuit.

DETAILED DESCRIPTION OF THE PREFERRED EMBODIMENTS

An inverter device according to one embodiment of the present invention will now be described with reference to the drawings. The inverter device is mounted on a forklift and activates a vehicle driving electric motor and a cargo handling electric motor of the forklift. The forklift is a battery-operated forklift. The forklift is driven by the vehicle driving electric motor and performs cargo handling with the cargo handling electric motor. That is, when an operator operates an accelerator pedal in a state in which the key is turned on, the vehicle driving electric motor is activated to drive the forklift forward or rearward. When the operator manipulates the lift lever, the cargo handling electric motor is activated to lift or lower the fork to handle a cargo. Such a forklift may be used in a cold storage in which the ambient temperature is less than or equal to −40° C.

Figure 1:
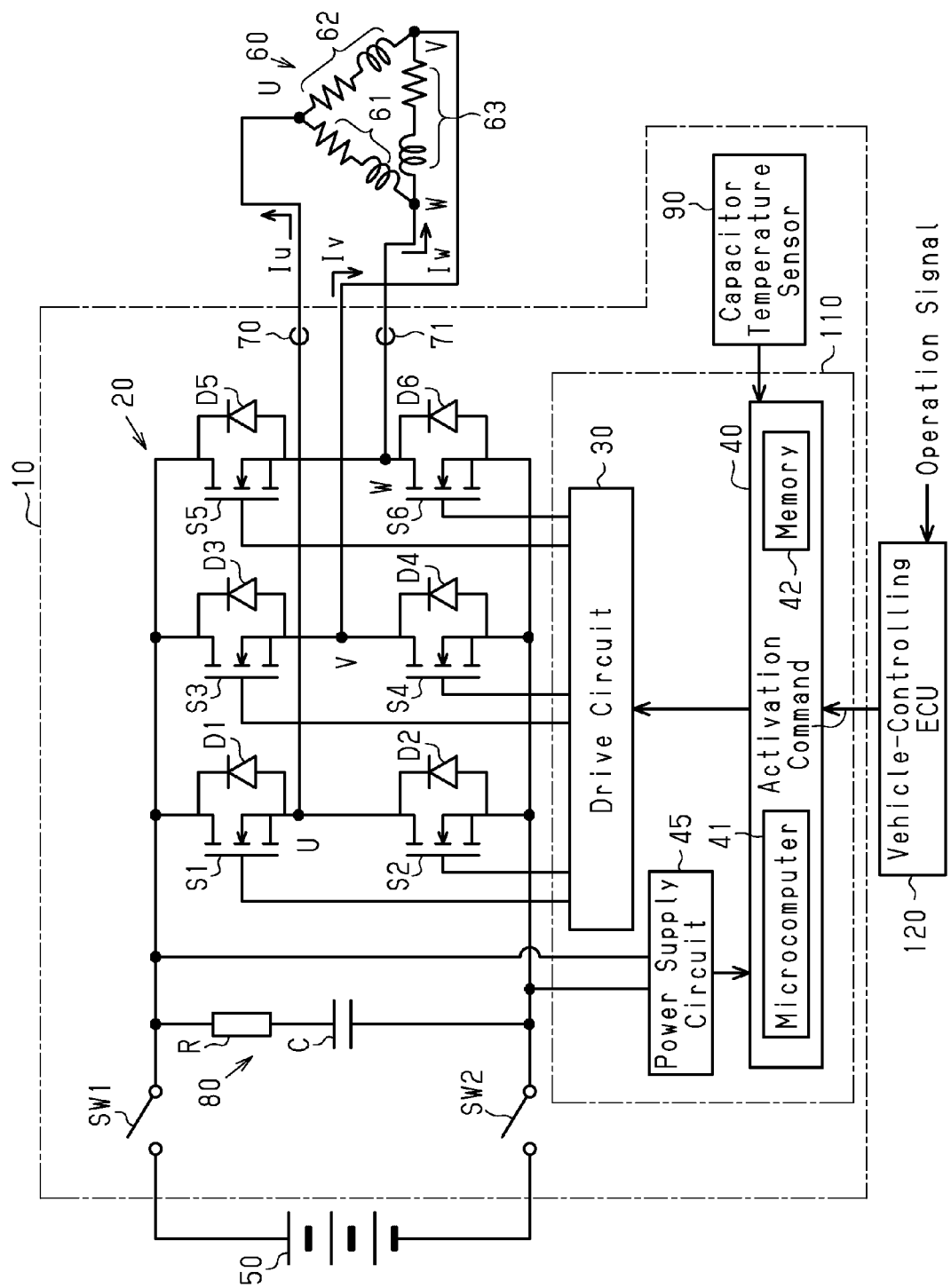
FIG. 1 is a circuit diagram of an inverter device according to one embodiment.

As shown in FIG. 1, an inverter (three-phase inverter) 10 includes an inverter circuit 20, a drive circuit 30, and a controller 40. The controller 40 functions as a control device for controlling the inverter circuit 20. The input side of the inverter circuit 20 is connected to a direct-current power source, which is a battery 50 in the present embodiment, via system relay switches SW1, SW2.

The output side of the inverter circuit 20 is connected to a vehicle driving electric motor (alternatively, a cargo handling electric motor) 60. A three-phase AC motor is used as the motor 60. The electric motor 60 includes coils 61, 62, 63 of different phases, which are connected to the output side of the inverter circuit 20.

The inverter circuit 20 has six switching elements S1 to S6. Each of the switching elements S1 to S6 is a power MOSFET. Insulated-gate bipolar transistors (IGBT) may be used as switching elements. The switching elements S1 to S6 are connected in antiparallel to feedback diodes D1 to D6, respectively.

In the inverter circuit 20, the first and second switching elements S1 and S2 are connected in series, the third and fourth switching elements S3 and S4 are connected in series, and the fifth and sixth switching elements S5, S6 are connected in series. The first, third, and fifth switching elements S1, S3, S5 are connected to the positive terminal of the direct-current power source, which is the battery 50 in the present embodiment, via the system relay switch SW1. The second, fourth, and sixth switching elements S2, S4, S6 are connected to the negative terminal of the battery 50 via the system relay switch SW2.

The system relay switches SW1, SW2 are closed in response to an ON operation of the key switch and are opened in response to an OFF operation of the key switch. In FIG. 1, the operation signal includes operation signals of the key switch.

A connecting point between the switching elements S1 and S2, which form upper and lower arms for the U-phase, is connected to the U-phase terminal of the electric motor 60. A connecting point between the switching elements S3 and S4, which form upper and lower arms for the V-phase, is connected to the V-phase terminal of the electric motor 60. A connecting point between the switching elements S5 and S6, which form upper and lower arms for the W-phase, is connected to the W-phase terminal of the electric motor 60. The inverter device 10 supplies alternating currents to the coils of respective phases of the electric motor 60, thereby driving the electric motor 60. As described above, the inverter circuit 20 has six switching elements S1 to S6 in a bridge connection.

The rated voltage of the battery 50 is, for example, 48 volts, and the withstand voltage of the switching elements S1 to S6 is approximately 75 volts.

Current sensors 70, 71 are provided between the inverter circuit 20 and the electric motor 60. The current sensors 70, 71 respectively detect the current values of currents Iu and Iw of the U-phase and W-phase, which are two phases of the three-phase currents Iu, Iv, Iw supplied to the electric motor 60.

An electrolytic capacitor 80 is connected to the input side of the inverter circuit 20 to be parallel with the battery 50. The first, third, and fifth switching elements S1, S3, S5 are connected to the positive terminal of the electrolytic capacitor 80, and the second, fourth, and sixth switching elements S2, S4, S6 are connected to the negative terminal of the electrolytic capacitor 80. In general, if a capacitor is regarded as an equivalent circuit, the capacitor can be considered as including, in addition to an ideal capacitor component, a resistance component R and an inductor component L. In FIG. 1, the electrolytic capacitor 80 is equivalently represented by an ideal capacitor C and the resistance component R, which are connected in series. The resistance component R is an equivalent series resistance (ESR) of the capacitor.

As described above, the input side of the inverter circuit 20 is connected to the battery 50, which serves as a direct-current power source, and the electrolytic capacitor 80, which are connected in parallel.

The inverter device 10 further includes a capacitor temperature sensor 90, which detects the temperature of the electrolytic capacitor 80. The capacitor temperature sensor 90, which functions as a temperature detector, is connected to the controller 40, so that the controller 40 detects the temperature of the electrolytic capacitor 80 (capacitor temperature). When controlling the electric motor 60 to perform normal operation under a low-temperature environment, the inverter device 10 functions to limit the currents output to the electric motor 60 to protect the electric motor 60 and components of the inverter device 10. For example, when the temperature of the electrolytic capacitor 80 (capacitor temperature) drops, for example, to or below −20° C., the output currents to the electric motor 60 are limited.

The inverter device 10 includes a power supply circuit 45. The power supply circuit 45 is connected to the battery 50 via the system relay switches SW1, SW2. The power supply circuit 45 receives a voltage from the battery 50 and steps down the voltage to a predetermined voltage (for example, 15 volts) before supplying the voltage to the controller 40. The controller 40 includes a microcomputer 41 and a memory 42. The microcomputer 41 operates upon receipt of the voltage (for example, 15 volts) from the power supply circuit 45.

The memory 42 stores various control programs necessary for driving the electric motor 60 and various data and maps for executing the control programs. The control program includes a normal control program for drivingly rotating the electric motor (motor) 60 and a control program for supplying a direct current to the electric motor 60 for warm-up control when the ambient temperature is low.

Figure 2:
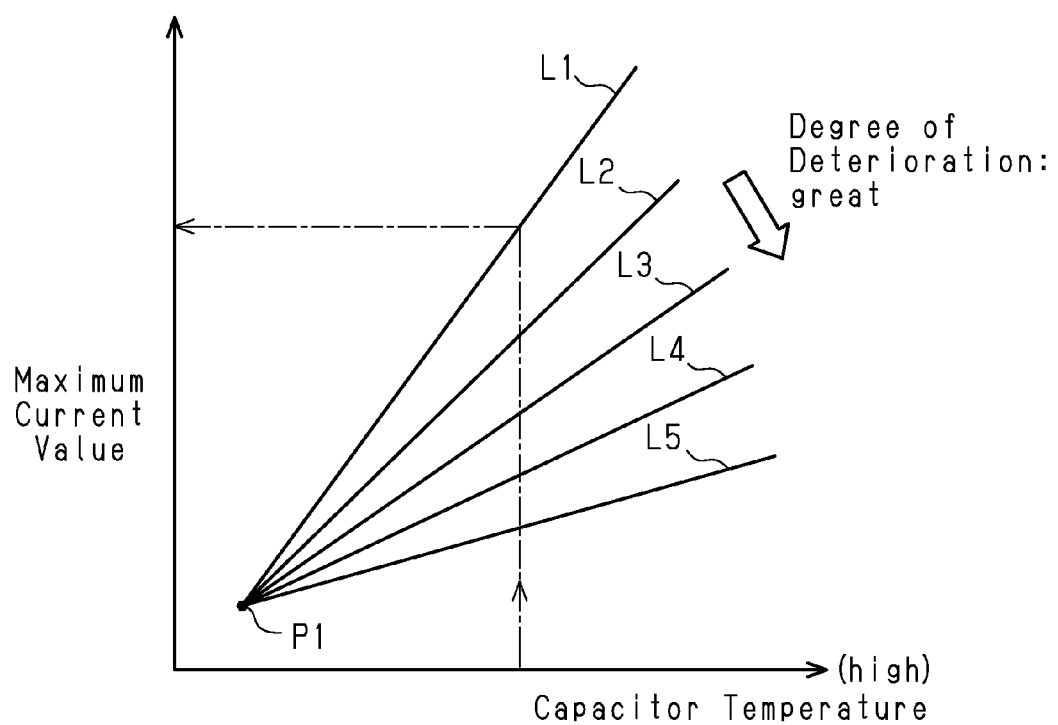
FIG. 2 is an explanatory diagram of a map stored in a memory.

The memory 42 also stores the map shown in FIG. 2. In FIG. 2, the horizontal axis represents the temperature of the electrolytic capacitor 80, and the vertical axis represents the maximum current value supplied during warm-up. FIG. 2 shows characteristic lines L1, L2, . . . . The characteristic lines L1, L2, . . . linearly extend from the point P1 diagonally upward and rightward. In the map, the greater the degree of deterioration of the electrolytic capacitor 80, the smaller the inclination becomes. The map is used to obtain the maximum current value supplied during warm-up based on the temperature of the electrolytic capacitor 80 and the degree of deterioration of the electrolytic capacitor 80.

The controller 40 is connected to the gates of the switching elements S1 to S6 via the drive circuit 30. The current sensors 70, 71 are connected to the controller 40. Based on detection signals from the sensors 70, 71, the controller 40 outputs control signals to the switching elements S1 to S6 via the drive circuit 30 such that the electric motor 60 generates power to a target level. The inverter circuit 20 converts the direct current from the battery 50 and the electrolytic capacitor 80 into alternating currents of three phases having an appropriate frequency and outputs the alternating currents to the electric motor 60.

The vehicle has a vehicle-controlling electronic control unit (ECU) 120. The vehicle-controlling ECU 120 receives operation signals from operation sensors (not shown) manipulated by the operator and controls the movement of the vehicle, accordingly. The controller 40 is connected to the vehicle-controlling ECU 120 and detects manipulation of the key switch. The controller 40, the drive circuit 30, and the power supply circuit 45 of the inverter 10 are mounted on a control board 110.

The microcomputer 41 sums a closed circuit time of the system relay switches SW1, SW2 (the ON time of the key switch) and stores the result as an integrated inverter ON time in the memory 42. The integrated inverter ON time is an integrated connection time of the battery 50 to the electrolytic capacitor 80. That is, the connection time is the sum total of the time during which the electrolytic capacitor 80 is electrically connected to the battery 50.

The microcomputer 41 also sums an activation time (power running time and regeneration time) of the electric motor 60 by the inverter device 10 and stores the result as an integrated motor activation time in the memory 42. The integrated motor activation time is the integrated activation time of the inverter device 10. That is, the activation time is the sum total of the time during which the inverter device 10 is activated.

Operation of the inverter device 10 will now be described.

Deterioration of the electrolytic capacitor 80 is known to progress by long-term use even at ordinary temperatures, causing the internal resistance of the electrolytic capacitor 80 to gradually increase. When the electrolytic capacitor 80 is used under a low-temperature environment, the internal resistance of the electrolytic capacitor 80 is increased by an amount corresponding to the decrease in the temperature in addition to the internal resistance at ordinary temperatures. Thus, the warm-up control is conventionally performed based on a case in which the degree of deterioration of the electrolytic capacitor is the maximum as shown by characteristic line L10 in FIG. 5. Such a control, however, requires a long time for the warm-up control even if deterioration of the electrolytic capacitor has not progressed.

In the present embodiment, the amount of current to be supplied is determined in accordance with the degree of deterioration as follows.

Figure 3:
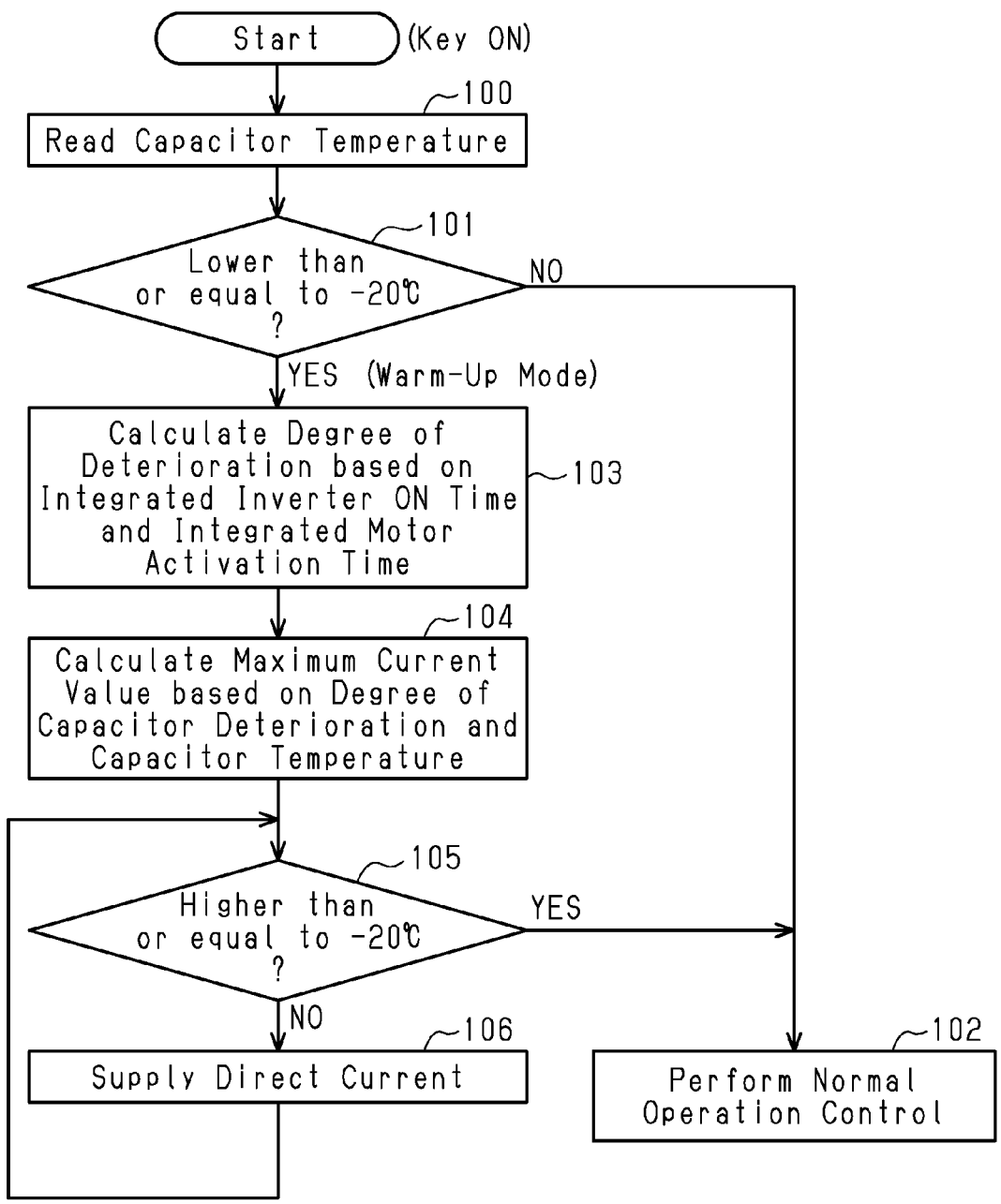
FIG. 3 is a flowchart for describing operation of the inverter device.

As shown in FIG. 3, when the key switch is turned on, the microcomputer 41 receives the temperature of the electrolytic capacitor 80 detected by the capacitor temperature sensor 90 in step 100 and determines whether the temperature is less than or equal to −20° C. in step 101. If the temperature of the electrolytic capacitor 80 is higher than −20° C., the microcomputer 41 proceeds to step 102 and performs normal operation control.

In step 101, if the temperature of the electrolytic capacitor 80 is less than or equal to −20° C., the microcomputer 41 sets a warm-up mode. In step 103, the microcomputer 41 in the warm-up mode calculates the degree of deterioration of the electrolytic capacitor 80 (degree of capacitor deterioration) based on the integrated inverter ON time and the integrated motor activation time. The longer at least one of the integrated inverter ON time and the integrated motor activation time, the greater the degree of deterioration of the electrolytic capacitor 80 is set to. In step 104, the microcomputer 41 calculates the maximum current value based on the degree of capacitor deterioration and the temperature of the electrolytic capacitor 80 detected by the capacitor temperature sensor 90 using the map of FIG. 2. That is, the microcomputer 41 calculates the maximum current value corresponding to the degree of deterioration of the electrolytic capacitor 80. More specifically, if deterioration of the electrolytic capacitor 80 has not progressed, the maximum current value is set to a great value, and if deterioration of the electrolytic capacitor 80 has progressed, the maximum current value is set to a small value.

In step 105, if the temperature of the electrolytic capacitor 80 is less than or equal to −20° C., the microcomputer 41 proceeds to step 106. In step 106, the microcomputer 41 controls the switching elements S1 to S6 of the inverter circuit 20 to supply an electric current to the electrolytic capacitor 80 at the calculated maximum current value via the coils of respective phases of the electric motor 60. That is, the warm-up control is performed in which a direct current is supplied.

In step 105, if the temperature of the electrolytic capacitor 80 exceeds −20° C., the microcomputer 41 proceeds to step 102 and performs the normal operation control.

As described above, if the temperature of the electrolytic capacitor 80 is extremely low (for example, approximately −40° C.), the inverter device 10 supplies direct currents to the electric motor 60 to increase the temperature of the electrolytic capacitor 80. When the temperature of the electrolytic capacitor 80 reaches a prescribed value (for example, −20° C.), that is, the temperature at which the electric motor 60 can be started, the normal operation control is performed. In other words, the inverter device 10 supplies alternating currents to the electric motor 60.

The maximum current value will be described using FIG. 4.

Figure 4:
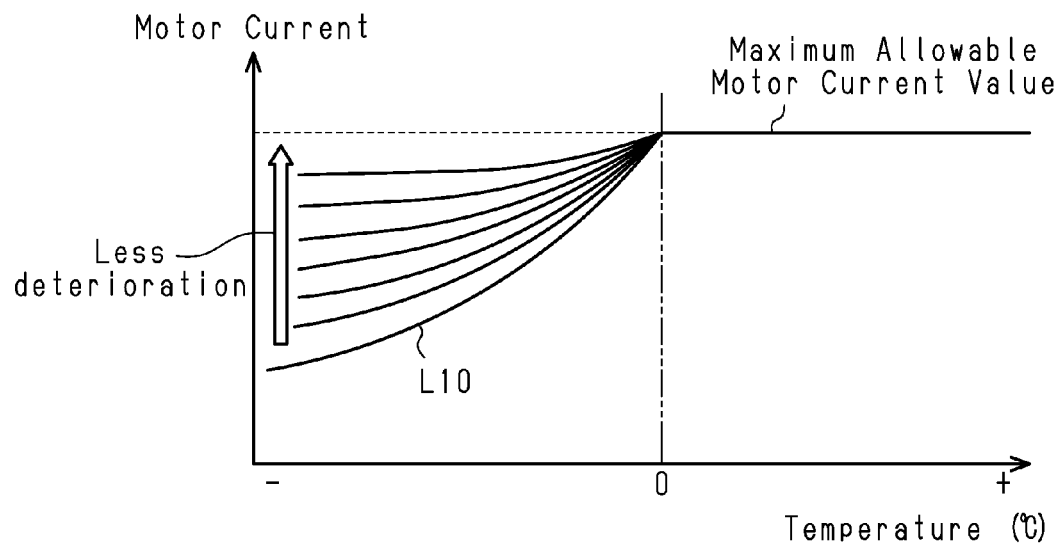
FIG. 4 is an explanatory diagram of the maximum current value.

In FIG. 4, the horizontal axis represents the temperature of the electrolytic capacitor 80, and the vertical axis represents the maximum current value.

Figure 5:
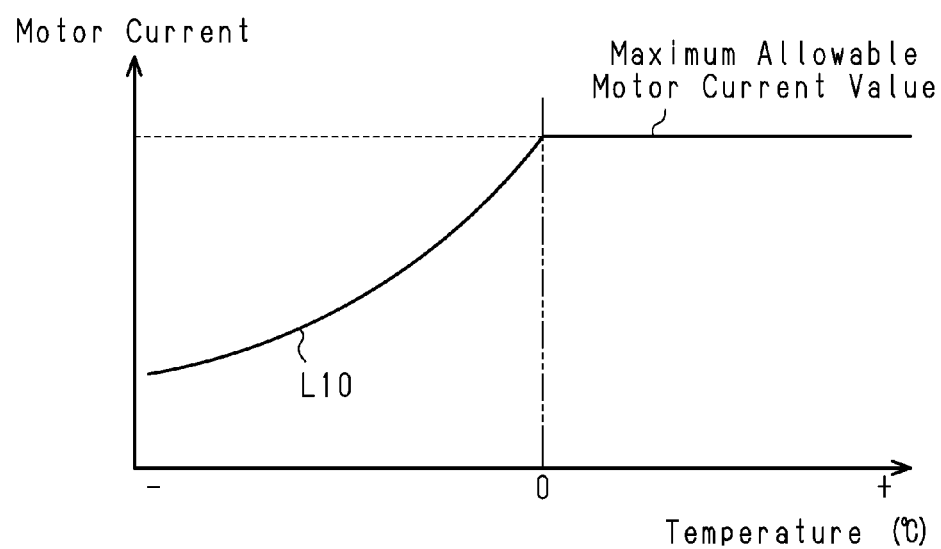
FIG. 5 is an explanatory diagram of the maximum current value for describing an issue of a conventional inverter device.

As shown by characteristic line L10 in FIG. 5 (also shown one above the other in FIG. 4), the time required for the temperature of the electrolytic capacitor 80 to increase to a predetermined temperature (0° C. in FIG. 5) depends on the maximum current value. In the conventional inverter device, the maximum current value (L10) is determined while factoring in the increase in the internal resistance due to deterioration of the electrolytic capacitor 80. Thus, the time required for the temperature of the electrolytic capacitor 80 to increase to the predetermined temperature is longer than the time required in a case in which the maximum current value (L10) is determined based on the internal resistance before the deterioration.

In FIG. 4 of the present embodiment, the maximum current value is specified depending on the degree of deterioration of the electrolytic capacitor 80. That is, the lower the degree of deterioration of the electrolytic capacitor 80, the greater the maximum current value of current supplied to the electrolytic capacitor 80 is set to. Thus, if deterioration of the electrolytic capacitor 80 has not progressed, the maximum current value is increased to quickly end the warm-up control.

More specifically, the internal controller 40 of the inverter device 10 calculates the integrated inverter ON time and the integrated motor activation time. The degree of capacitor deterioration is estimated considering that the deterioration of the electrolytic capacitor 80 is caused by temperature increase that occurs when electric current are supplied to the electrolytic capacitor 80 for charging when the system relay switches SW1, SW2 are on and also by heat when electric current are supplied to the electrolytic capacitor 80 during regeneration and power running. The maximum current value is determined in accordance with the degree of deterioration and the temperature of the electrolytic capacitor 80 to complete the warm-up operation at an early stage.

The above described embodiment has the following advantages.

(1) The inverter device 10 includes the capacitor temperature sensor 90 and the microcomputer 41, which serves as the degree-of-deterioration determiner and the warm-up controller. The microcomputer 41 determines the degree of deterioration of the electrolytic capacitor 80. If the temperature of the electrolytic capacitor 80 detected by the capacitor temperature sensor 90 is less than the prescribed temperature, the microcomputer 41 controls the switching elements S1 to S6 of the inverter circuit 20 to supply direct currents that are set based on the degree of deterioration of the electrolytic capacitor 80 and the capacitor temperature to the coils of the electric motor 60. Thus, when the ambient temperature is low, warm-up of the electrolytic capacitor 80 is promptly completed.

That is, under a low-temperature environment, since the internal resistance of the capacitor is greater than that at ordinary temperatures, the degree of decrease in the voltage when supplying a warm-up current to the elements is increased. In general, deterioration of an electrolytic capacitor progresses in accordance with the time of use, and the internal resistance increases in accordance with the degree of deterioration. The degree of voltage drop when supplying a warm-up current to the elements is also increased in accordance with the deterioration. When the decreased voltage value becomes less than a designed value of the control board, the microcomputer mounted on the control board is reset so that the warm-up control is interrupted. To avoid such a situation, conventionally, a warm-up current that can be supplied to the elements at each ambient temperature is limited based on the maximum degree of deterioration of the capacitor. However, the method requires a long time for the capacitor to be heated to the predetermined temperature and fails to meet the needs for operating at an early stage.

In contrast, in the present embodiment, since the switching elements S1 to S6 of the inverter circuit 20 are controlled to supply the optimal direct current set based on the degree of deterioration of the electrolytic capacitor 80 to the coils of the electric motor, the warm-up of the electrolytic capacitor 80 is promptly completed at a low ambient temperature.

(2) The microcomputer 41, which serves as the degree-of-deterioration determiner, determines the degree of deterioration of the electrolytic capacitor 80 based on the connection time, which is the sum total of the time during which the electrolytic capacitor 80 is electrically connected to the direct-current power source, or the battery 50, and the activation time, which is the sum total of the time during which the inverter device 10 is activated. Thus, the degree of deterioration is more accurately calculated.

(3) The lower the temperature of the electrolytic capacitor 80 is, the lower the current value of the direct current is set. This is more preferable than the conventional inverter device.

The present embodiment is not limited to the above configuration, but may be modified as follows.

The integrated connection time of the battery 50 to the capacitor, which is the integrated inverter ON time, and the integrated activation time of the inverter, which is the integrated motor activation time, are measured by the controller 40 inside the inverter device 10, but may be measured outside the inverter device 10. More specifically, the above measurements may be performed in a different ECU, for example, the vehicle-controlling ECU 120. That is, the inverter device may include the vehicle-controlling ECU 120.

The capacitor temperature sensor 90, which directly detects the temperature of the electrolytic capacitor 80, is used. However, the temperature of the electrolytic capacitor 80 does not necessarily have to be directly detected, but the temperature of the electrolytic capacitor 80 may be indirectly detected, or estimated. For example, the temperature of the electrolytic capacitor 80 may be detected, or estimated, by measuring the temperature of the control board 110.

The invention claimed is:

1. An inverter device comprising:
   an inverter circuit including a plurality of switching elements in a bridge connection;
   a capacitor connected in parallel to an input side of the inverter circuit;
   a temperature detector that detects a temperature of the capacitor; and
   a microcomputer that determines a degree of deterioration of the capacitor,
   and determines, when the detected temperature of the capacitor is lower than a prescribed temperature, a maximum allowable value of a direct current that is supplied from the plurality of switching elements to an electric motor connected to an output side of the inverter circuit, based on a map indicating a relationship between the temperature of the capacitor and the maximum allowable value of the direct current in accordance with the degree of deterioration of the capacitor.

2. The inverter device according to claim 1, wherein the microcomputer determines the degree of deterioration of the capacitor based on a connection time, which is a total amount of time during which the capacitor is electrically connected to a direct-current power source connected to the input side of the inverter circuit, and an activation time, which is a total amount of time during which the inverter circuit is activated.

3. The inverter device according to claim 2, wherein the microcomputer determines that the longer at least one of the connection time and the activation time, the greater the degree of deterioration of the capacitor is.

4. The inverter device according to claim 1, wherein the map indicates that the lower the temperature of the capacitor, the lower the maximum allowable value of the direct current is.

5. The inverter device according to claim 1, wherein the map indicates that the greater the degree of deterioration of the capacitor, the lower the maximum allowable value of the direct current is.

* * * * *